United States Patent
Hodges

(10) Patent No.: US 10,227,050 B2
(45) Date of Patent: Mar. 12, 2019

(54) EXHAUST TIP

(71) Applicant: Pilot Inc., City of Industry, CA (US)

(72) Inventor: Frank Hodges, Corona, CA (US)

(73) Assignee: Pilot Inc., City of Industry, CA (US)

(*) Notice: Subject to any disclaimer, the term of this patent is extended or adjusted under 35 U.S.C. 154(b) by 0 days.

(21) Appl. No.: 15/268,160

(22) Filed: Sep. 16, 2016

(65) Prior Publication Data

US 2017/0072874 A1    Mar. 16, 2017

Related U.S. Application Data

(60) Provisional application No. 62/219,577, filed on Sep. 16, 2015.

(51) Int. Cl.
| | |
|---|---|
| *B60R 13/00* | (2006.01) |
| *F01N 13/08* | (2010.01) |
| *G09F 21/04* | (2006.01) |
| *F01N 13/16* | (2010.01) |

(52) U.S. Cl.
CPC ......... *B60R 13/005* (2013.01); *F01N 13/082* (2013.01); *F01N 13/16* (2013.01); *F01N 2530/18* (2013.01); *G09F 21/04* (2013.01)

(58) Field of Classification Search
CPC ...... B60R 13/005; G09F 21/04; F01N 13/082
USPC ................................ 181/227, 228; D12/294
See application file for complete search history.

(56) References Cited

U.S. PATENT DOCUMENTS

| | | | | |
|---|---|---|---|---|
| D133,788 S | * | 9/1942 | Koch | D12/194 |
| D164,960 S | * | 10/1951 | Russell | 293/113 |
| 2,630,835 A | * | 3/1953 | Russell | F16L 7/00 |
| | | | | 285/123.1 |
| D189,573 S | * | 1/1961 | Russell | D12/194 |
| D191,509 S | * | 10/1961 | Feinberg | D12/194 |
| 3,043,097 A | * | 7/1962 | Inman | F01N 13/082 |
| | | | | 181/262 |
| D247,360 S | * | 2/1978 | Hamaguchi | D12/194 |
| 4,354,573 A | * | 10/1982 | Tabata | F01N 13/082 |
| | | | | 181/239 |
| 5,508,478 A | * | 4/1996 | Barry | B60K 13/04 |
| | | | | 180/309 |
| D384,319 S | * | 9/1997 | Harutiunian | D12/194 |
| 5,831,223 A | * | 11/1998 | Kesselring | F01N 1/08 |
| | | | | 181/227 |
| D413,296 S | * | 8/1999 | Hussaini | D12/194 |
| 6,006,859 A | * | 12/1999 | Hussaini | F01N 13/082 |
| | | | | 181/227 |
| 6,085,863 A | * | 7/2000 | Shuen | F01N 13/082 |
| | | | | 181/227 |
| D467,210 S | * | 12/2002 | Yu | D12/194 |
| D468,673 S | * | 1/2003 | Horowitz | D12/194 |
| D490,038 S | * | 5/2004 | Macaluso | D12/194 |
| 6,758,042 B2 | * | 7/2004 | Huang | F01N 1/18 |
| | | | | 60/280 |
| D506,170 S | * | 6/2005 | Thiesen | D12/194 |
| D513,397 S | * | 1/2006 | Lovato | D12/194 |
| D523,796 S | * | 6/2006 | Marques | D12/194 |
| 7,448,463 B1 | * | 11/2008 | Darmody | B60K 13/04 |
| | | | | 180/296 |

(Continued)

*Primary Examiner* — Jeremy A Luks
(74) *Attorney, Agent, or Firm* — Sheridan Ross P.C.

(57) ABSTRACT

A decorative automotive exhaust comprising cut outs on an exterior portion to expose a decorative plate. The depth of the decorative plate relative to the cut outs creates a 3D perspective.

20 Claims, 6 Drawing Sheets

(56) References Cited

U.S. PATENT DOCUMENTS

| | | | |
|---|---|---|---|
| 7,464,787 B2 * | 12/2008 | Davis, Jr. | F01N 13/20 181/227 |
| 2003/0231506 A1 * | 12/2003 | Chen | B60Q 1/2688 362/487 |
| 2004/0012977 A1 * | 1/2004 | Hou | B60Q 1/2688 362/545 |
| 2005/0056482 A1 * | 3/2005 | Tsai | F01N 13/082 181/227 |
| 2005/0056483 A1 * | 3/2005 | Tsai | F01N 13/082 181/227 |
| 2005/0061571 A1 * | 3/2005 | Chen | F01N 13/082 180/309 |
| 2005/0139417 A1 * | 6/2005 | Quast | F01N 13/082 181/227 |
| 2005/0167191 A1 * | 8/2005 | Miller | F01N 13/082 181/227 |
| 2012/0024410 A1 * | 2/2012 | Riley | F01N 13/082 138/109 |
| 2014/0259825 A1 * | 9/2014 | Galvan | G09F 21/04 40/541 |
| 2014/0326350 A1 * | 11/2014 | Riley | F01N 13/082 138/108 |
| 2016/0084138 A1 * | 3/2016 | Ferguson | F01N 13/082 138/114 |

* cited by examiner

EXHAUST TIP

CROSS-REFERENCE TO RELATED APPLICATION

This application claims priority to U.S. provisional application No. 62/219,577 filed Sep. 16, 2015 the contents of which are hereby incorporated by reference.

FIELD OF THE INVENTION

The present invention is in the field of exhaust tips for vehicles in particular trucks that have custom appearance.

BACKGROUND

There are numerous silencers and muffler exhaust tips available on the market for vehicle owners that want to customize their vehicles. Most of the aftermarket exhaust tips on the market are decorative in nature given that the exhaust tip is usually the only part of the engine muffler system that is visible to ordinary observers. Presently, most exhaust tips are limited in appearance and customization. U.S. Pat. No. 6,085,863 to Shuen, U.S. Design Pat. No. 413,296 to Hussaini, U.S. Design Pat. No. 384,319 to Harutiunian, U.S. Design Pat. No. 191,509 to Feinberg, and U.S. Design Pat. No. 164,960 to Russell, disclose a decorative exhaustion pipe.

U.S. Pat. No. 6,006,859 to Hussaini discloses a decorative muffler exhaust tip that serves to amplify exhaust noise.

U.S. Pat. No. 4,354,573 to Tabata, et al., and U.S. Pat. No. 5,831,223 to Kesselring, disclose an exhaust piece that serves to further silence the noise from the exhaust of the engine to which the muffler system is connected.

Others, such as U.S. Design Pat. No. 189,573 to Russell, and U.S. Design Pat. No. 133,788 to Koch, disclose a tailpipe tip that diverts the exhaust in a particular direction.

Some, such as U.S. Pat. No. 3,043,097 to Inman, et al., and U.S. Design Pat. No. 247,360 to Hamaguchi, et al., disclose exhaust tips that channel air from around the muffler exhaust tip in a manner that creates a negative pressure on the muffler system when the vehicle is in motion.

U.S. Pat. No. 2,630,835 to Russell discloses a clamping means for an exhaust tail pipe.

U.S. Pat. No. 7,152,710 to Huang et al. discloses an exhaust tip having a set of LEDs that automatically illuminate when heated exhaust gases pass through the tip. Exhaust tips are typically provided for trucks to provide a custom appearance, engine sound, and improve engine performance. The present invention provides new methods and designs to customize exhaust tips. These publications and all other referenced patents are incorporated herein by reference in their entirety. Furthermore, where a definition or use of a term in a reference, which is an incorporated reference here, is inconsistent or contrary to the definition of that term provided herein the definition of the term provided herein applies and the definition of that term in the reference does not apply. Although various improvements are known to the art, all, or almost all of them suffer from one or more than one disadvantage. Therefore, there is a need to provide an improved exhaust tip.

SUMMARY OF THE INVENTION

In view of the shortcomings of the prior art, it is an object of this invention to provide an exhaust tip with a customizable appearance.

Another object of this invention is to provide an exhaust tip which does not impede engine performance.

Another object of this invention is to provide an exhaust tip which does not impede sound performance.

It is to be understood that the foregoing general description and the following detailed description are exemplary and explanatory only and are not to be viewed as being restrictive of the present invention, as claimed. Further advantages of this invention will be apparent after a review of the following detailed description of the disclosed embodiments and in the appended claims.

DETAILED DESCRIPTION OF THE EMBODIMENTS

Figure 1:
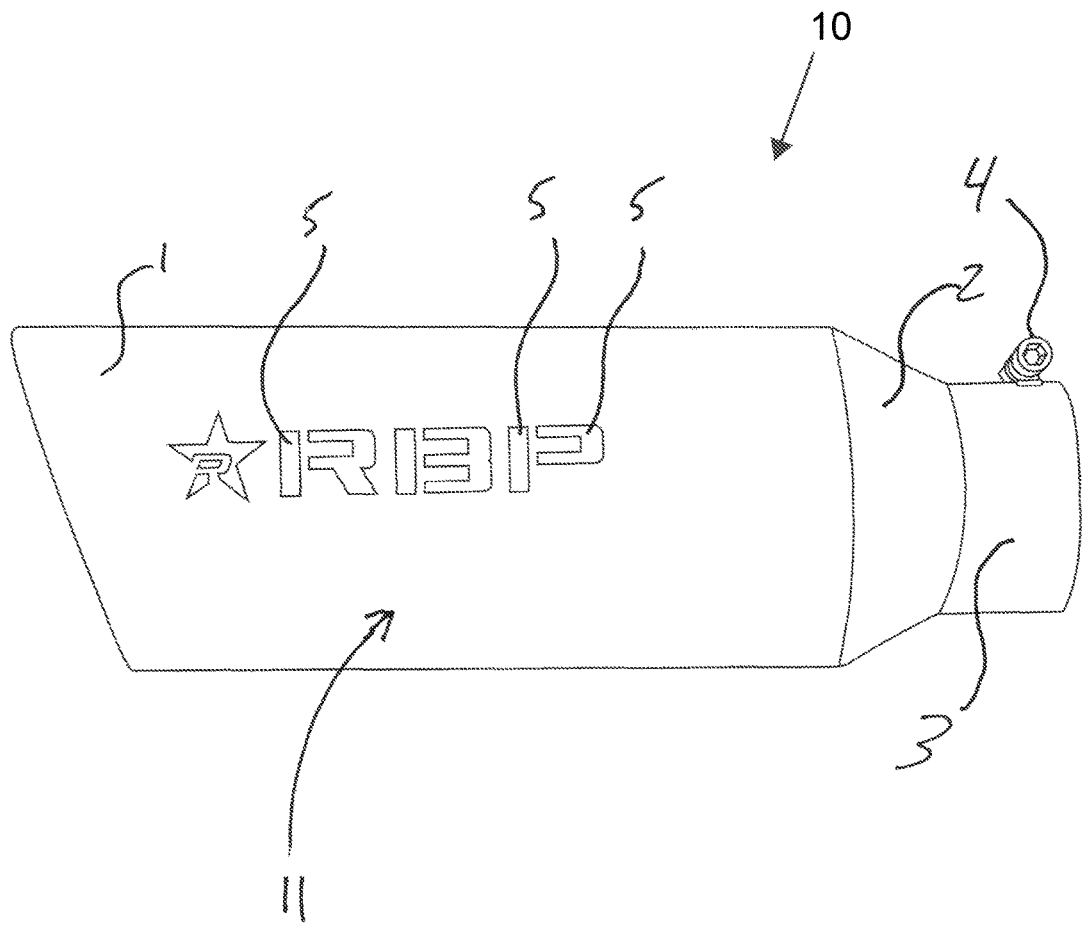
FIG. 1 shows a preferred embodiment of an exhaust tip from a right side perspective.
Figure 2:
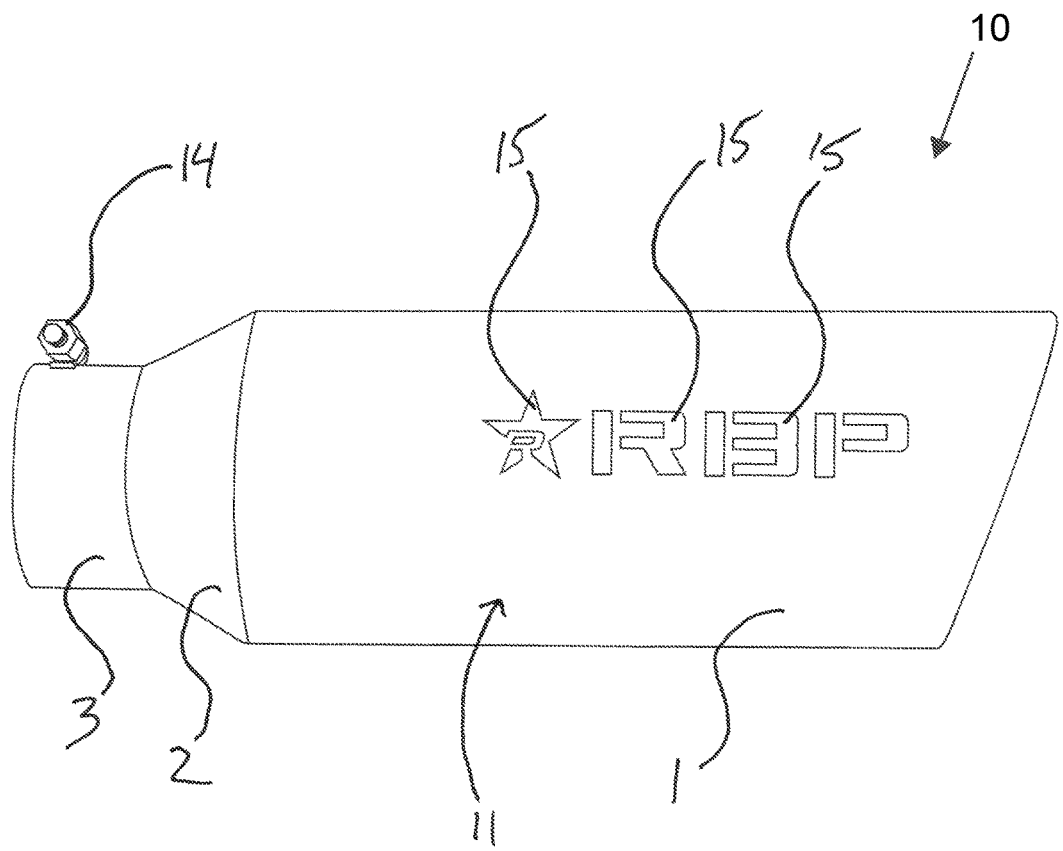
FIG. 2 shows a preferred embodiment of an exhaust tip from a left side perspective.
Figure 3:
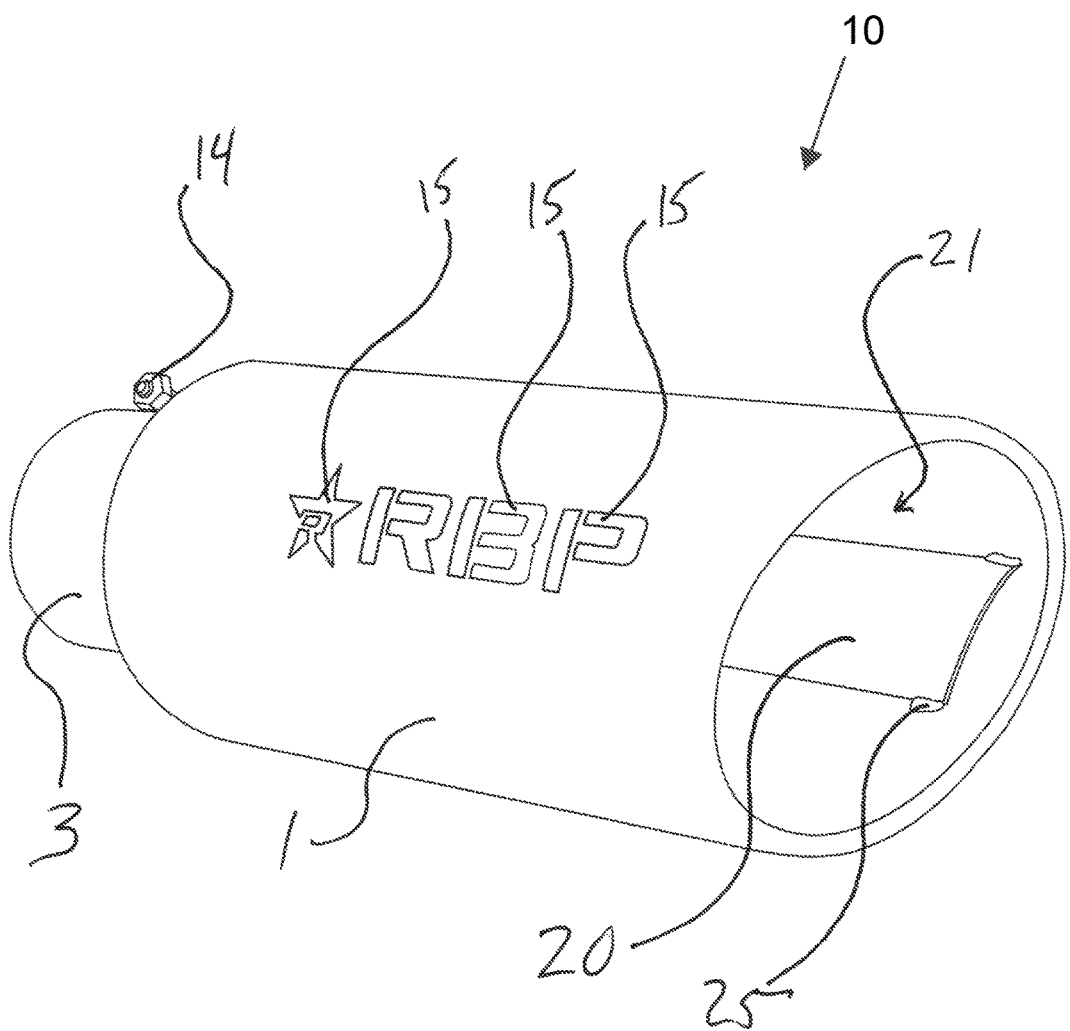
FIG. 3 shows a preferred embodiment of an exhaust tip from an oblique perspective.
Figure 4:
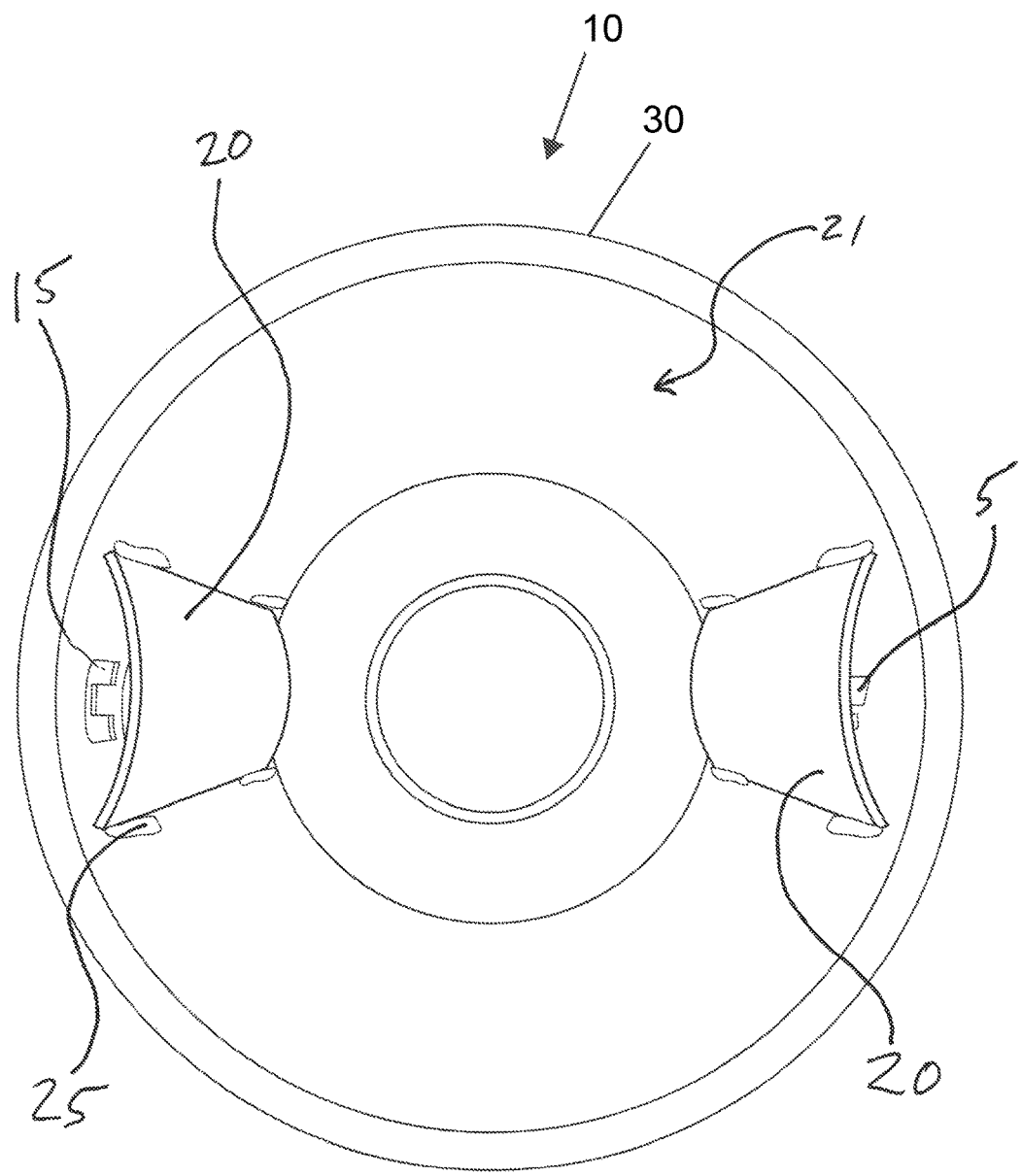
FIG. 4 shows a preferred embodiment of an exhaust tip from a back side perspective.
Figure 5:
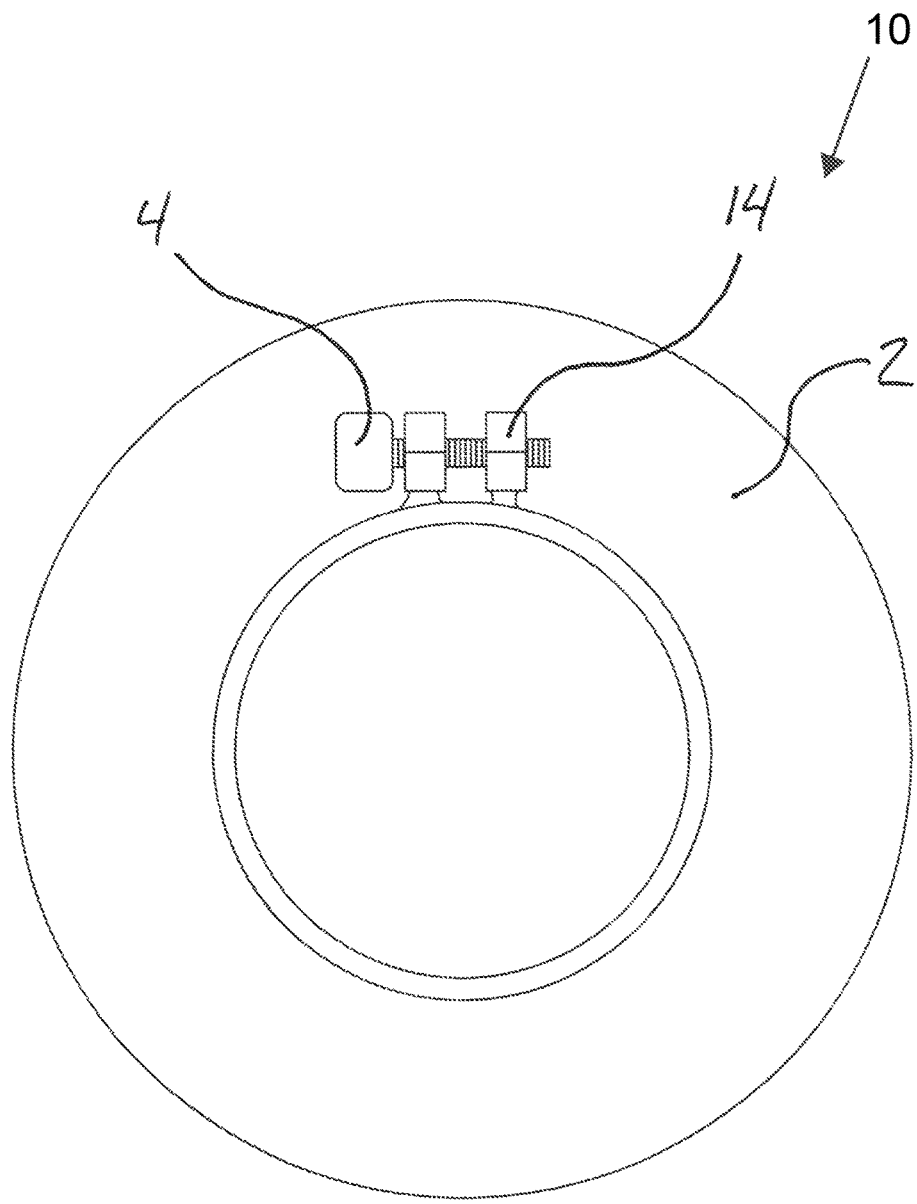
FIG. 5 shows a preferred embodiment of an exhaust tip from a mounting side perspective.
Figure 6:
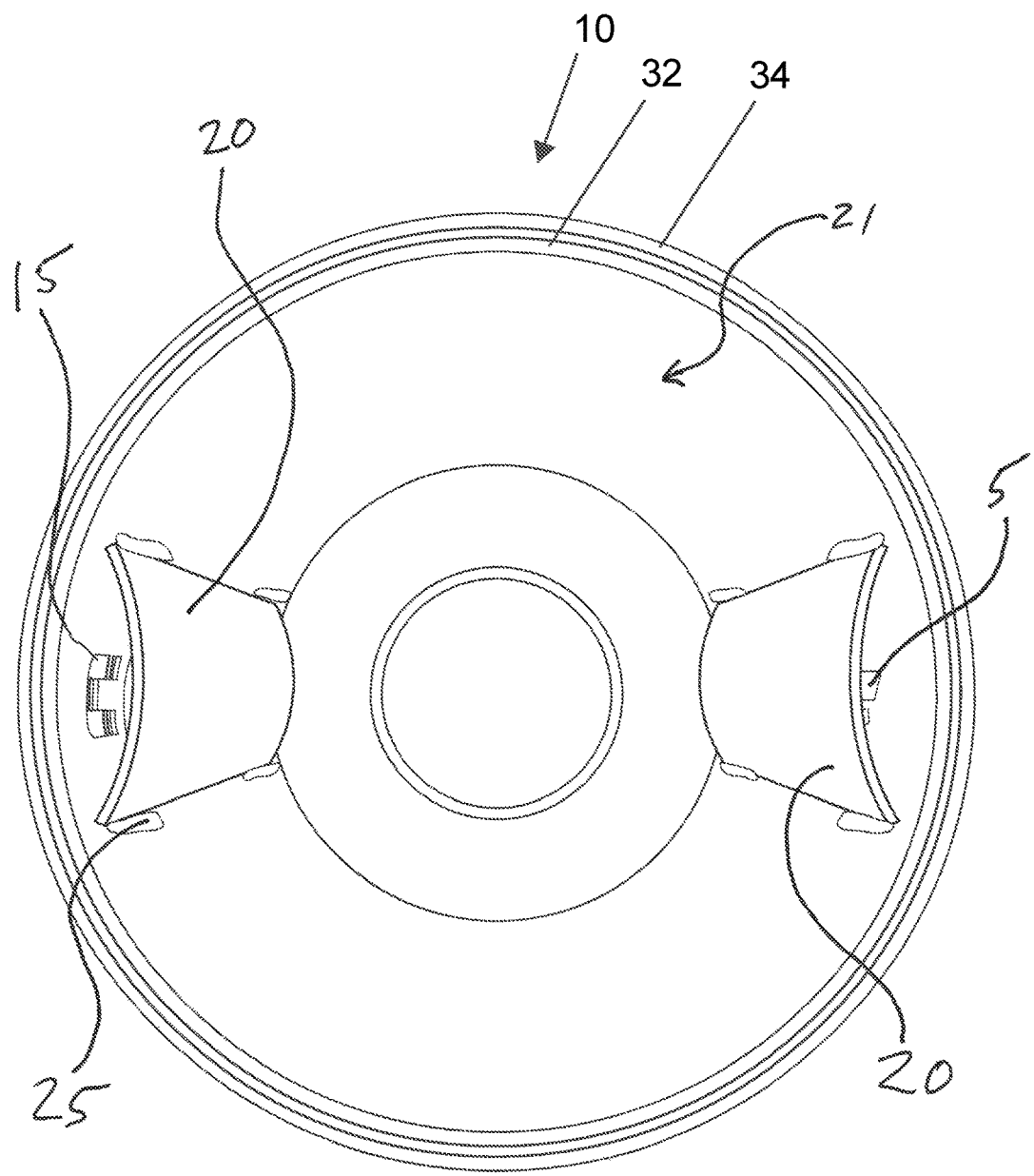
FIG. 6 shows an alternative embodiment of an exhaust tip from a back side perspective.

Referring now to the drawings wherein the showings are for purposes of illustrating a preferred embodiment of the present invention and not for purposes of limiting the same, FIGS. 1-6 show an exhaust tip 10. Exhaust tip 10 comprises a main exhaust tip portion 1, a neck portion 2, and an attachment portion 3. The neck portion 2 generally provides for a transition between the main exhaust tip portion 1 and the attachment portion 3 but is not an absolute requirement for the functioning of the present invention. The attachment portion 3 can further comprise a nut 4 and threaded assembly 14 to crimp the exhaust tip 10 on to an existing vehicle tail pipe. The attachment method described is not intended to be limiting additional common attachment means and methods include bolts, screws, welding, adhesives, polymeric ribbons. The exhaust tip 10 further has an outer surface 11 and inner surface 21, wherein the exhaust tip 10 can be single walled or double walled as common in exhaust tip design and manufacturing. FIG. 4 shows a single walled exhaust tip 10 comprising a cylindrical wall 30. FIG. 6 shows a double walled exhaust tip 10 comprising an inner cylindrical wall 32 and an outer cylindrical wall 34, wherein the inner cylindrical wall 32 and the outer cylindrical wall 34 are concentric. The present invention is directed to 3D decoration and logo display wherein the outer surface 11 and inner surface 21 are cut through typically with a laser but any commercial manufacturing cutting methods that can cut through metal, aluminum, steel would work; for example, plasma cutters and water jet cutters. The cutting of the design or logo 5 is shown in FIG. 1 on the right side of the exhaust tip 10. And again, the cutting of the design or logo 15 is shown in FIGS. 2-3 on the left side of the exhaust tip 10. The cutting process can be performed prior to the attachment of a decorative plate 20 or after the attachment of decorative plate 20. If the decorative plate 20 is attached prior to cutting a protective or sacrificial material may be used to protect the decorative plate 20. There is really no limit to the size of the logo 5,15 except for the dimensions of the main exhaust tip portion 1. The decorative plate 20 is attached the inside surface 21 of the exhaust tip. One or more decorative plate 20 may be affixed to the inside surface 21, in this preferred embodiment there are two decorative plate 20 attached. The method of attachment of the decorative plate 20 is typically done with spot welds 25 but could be performed with full length welds or other common means of affixing metal to metal. It is understood that there are heat resistant polymers and ceramic materials that can be substituted for metal commercially available and methods are well known in the automotive industry.

The main exhaust tip portion may be two to twelve inches in diameter with a preference of three to six inches in diameter. The main exhaust tip portion 1 length can be between eight inches and five and a half feet, with a preference of about ten to twenty-four inches in length.

While the decorative plate 20 can be made in almost any shape there are certain preferred embodiments believed to be novel in optimizing 3D reflection and optical illusion. For example, in a preferred embodiment the decorative plate 20 is concave with respect to the inside surface 21. The decorative plate 20 shape can be slightly round, elliptical, hyperbolic, or even flat with respect to the inside surface 21, what is important is that there be a gap between the outer surface 11 and inside surface 21. In an alternative embodiment the decorative plate 20 could be concave and complement the inside surface 21 in eluding any gap. The preferable gap distance is approximately one to two centimeters but could be one to fifteen centimeters for very large diameter main exhaust 1. The length of the decorative plate 20 is preferably shorter than the main exhaust 1 however, in an alternative embodiment it would be possible to have the decorative plate 20 extend beyond the length of the main exhaust and have additional design elements such as anodized aluminum or additional cut out shapes and logos. The surface of the decorative plate 20 can be painted or treated with different coloring agents to create a visible contrast between the decorative plate 20 and the outer surface 11. The decorative plate 20 could be ornamental with different combinations or alone reflective materials for reflecting light.

The foregoing description is, at present, considered to be the preferred embodiments of the present discovery. However, it is contemplated that various changes and modifications apparent to those skilled in the art, may be made without departing from the present discovery. Therefore, the foregoing description is intended to cover all such changes and modifications encompassed within the spirit and scope of the present discovery, including all equivalent aspects. Additional modifications and improvements of the present invention may also be apparent to those skilled in the art. Thus, the particular combination of parts described and illustrated herein in intended to represent only one embodiment of the invention, and is not intended to serve as limitations of alternative devices within the spirit and scope of the invention.

What is claimed is:

1. An exhaust tip comprising:
   a main exhaust tip portion comprising a cylindrical wall, the cylindrical wall comprising an exterior surface and an interior surface and having at least one aperture on a first side of the cylindrical wall, the aperture extending through the exterior surface and the interior surface;
   an attachment portion;
   a neck portion extending between the attachment portion and the main exhaust tip portion; and
   a decorative plate affixed to the interior surface of the cylindrical wall, the decorative plate intersecting every radius of the cylindrical wall that extends through the at least one aperture;
   wherein a radial distance between the interior surface and a midpoint of the decorative plate is between one and two centimeters.

2. The exhaust tip of claim 1, wherein the decorative plate is flat.

3. The exhaust tip of claim 1, wherein the decorative plate is shorter than the main exhaust tip portion.

4. The exhaust tip of claim 1, wherein the decorative plate is metal, ceramic or high temperature tolerant polymer.

5. The exhaust tip of claim 1, wherein the decorative plate is painted or anodized.

6. The exhaust tip of claim 1, wherein the decorative plate is curved.

7. The exhaust tip of claim 6, wherein a curvature of the decorative plate matches a curvature of the cylindrical wall.

8. The exhaust tip of claim 6, wherein the decorative plate is curved in a direction opposite to a curvature of the cylindrical wall.

9. The exhaust tip of claim 1, wherein the decorative plate is spot welded to the interior surface.

10. The exhaust tip of claim 1, wherein the decorative plate is longer than the main exhaust tip portion.

11. The exhaust tip of claim 1, further comprising:
    at least a second aperture on a second side of the cylindrical wall, the second side opposite the first side;
    a second decorative plate affixed to the interior surface of the cylindrical wall, the second decorative plate intersecting every radius of the cylindrical wall that extends through the at least a second aperture.

12. The exhaust tip of claim 11, wherein a maximum radial distance between the interior surface and the second decorative plate is between one and two centimeters.

13. The exhaust tip of claim 1, wherein the attachment portion comprises a threaded assembly and a nut.

14. An exhaust tip comprising:
    an attachment portion;
    a neck portion extending from the attachment portion;
    a main portion extending from the neck portion, the main portion comprising an inner cylindrical wall and an outer cylindrical wall concentric with the inner cylindrical wall, the inner cylindrical wall comprising an inner surface;
    at least one aperture extending through the inner cylindrical wall and the outer cylindrical wall of the main portion; and
    a plate attached to the inner surface of the inner cylindrical wall, the plate in radial alignment with an entirety of the at least one aperture;
    wherein the plate is concave relative to the at least one aperture and has a maximum radial distance from the at least one aperture between one and two centimeters.

15. The exhaust tip of claim 14, wherein the neck portion is tapered.

16. The exhaust tip of claim 14, further comprising:
    at least a second aperture extending through the inner cylindrical wall and the outer cylindrical wall of the main portion, the at least a second aperture positioned opposite the at least one aperture; and
    a second plate attached to the inner surface of the inner cylindrical wall, the second plate in radial alignment with an entirety of the at least a second aperture.

17. The exhaust tip of claim 14, wherein the plate is painted.

18. The exhaust tip of claim 14, wherein the main portion is between ten and twenty-four inches in length.

19. An exhaust accessory comprising:
   an exhaust tip comprising a cylindrical sidewall comprising an inside surface;
   an attachment section connected to the cylindrical exhaust tip, the attachment section configured for attachment to an exhaust pipe;
   a plurality of apertures extending through the cylindrical sidewall; and
   a decorative plate secured to the inside surface and positioned to block a line of sight through the plurality of apertures to a portion of the inside surface directly opposite the plurality of apertures;
   wherein the decorative plate is concave relative to the plurality of apertures and has a maximum radial distance from a nearest one of the plurality of apertures between one and two centimeters.

20. The exhaust accessory of claim 19, wherein the decorative plate is painted or anodized.

\* \* \* \* \*